Figure 1:
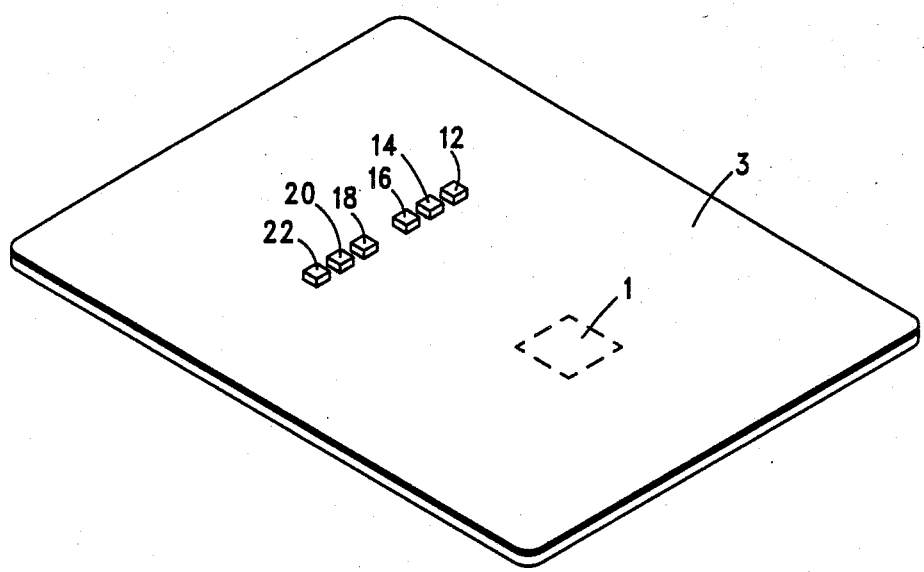

United States Patent [19]

Gercekci et al.

[11] Patent Number: 4,910,393

[45] Date of Patent: Mar. 20, 1990

[54] MEMORY CARDS

[75] Inventors: Anil Gercekci, Geneva; Michel Bron, Lausanne, both of Switzerland

[73] Assignee: Motorola, Inc., Schaumburg, Del.

[21] Appl. No.: 382,070

[22] Filed: Jul. 17, 1989

Related U.S. Application Data

[63] Continuation of Ser. No. 175,452, Mar. 30, 1988, abandoned.

[30] Foreign Application Priority Data

May 23, 1987 [GB] United Kingdom ................. 8712296

[51] Int. Cl.[4] .......................................... G06K 19/00
[52] U.S. Cl. .................................. 235/380; 235/379; 235/488
[58] Field of Search ..................... 235/380, 382, 382.5, 235/492, 488, 379, 375, 487; 364/918.3

[56] References Cited

U.S. PATENT DOCUMENTS 4,471,216 9/1984 Herve ................................. 235/380
4,697,073 9/1987 Hara .................................. 235/492

Primary Examiner—Teresa J. Walberg
Assistant Examiner—Leon K. Fuller

[57] ABSTRACT

A debit card of the type having an integrated circuit on a semiconductor chip embedded in a plastic card includes logic circuitry (10), a counter (2), a ROM (6) and an EEPROM (8) for storing the value of the counter between transactions. By providing two EEPROMs (8A, 8B) in parallel whose values are compared by a comparator (24), the security of the card is increased since operation of the card may be blocked if the two values are not the same, indicating that attempts have been made to fraudulently reprogram the card.

6 Claims, 2 Drawing Sheets

—PRIOR ART—

MEMORY CARDS

This application is a continuation of prior application Ser. No. 07/175,452, filed Mar. 30, 1988 (now abandoned).

This invention relates to memory cards of the type where an integrated circuit on a semiconductor chip having a non-volatile memory is embedded in a plastic card of a size similar to that of the most frequently used credit or cheque cards. Such cards may be so-call "smart" cards where the chip includes a microprocessor and may be used for low cost debit cards such as for the replacement of coins in applications like public telephones.

Such cards must be capable of providing adequate protection against misuse and fraudulent manipulation. As is known from, for example, an article entitled "Intelligent Non-Volatile Memory for Smart Cards" by Robert De Francesso and Hartmut Schrenk in IEEE Transactions on Consumer Electronics Vol. CE-32, No. 3 Aug. 1986, pages 604–607, storing information as a charge in a non-volatile memory in the chip is advantageous as it is not possible to detect charges either microscopically or chemically or to invalidate them during analysis.

The semiconductor chips used in such cards generally include a non-volatile electronic counter made up of a binary up-counter and of Electrically Erasable PROM bits (EEPROM). The EEPROM is programmed with information such as a user security code or Personal Identification Number (PIN) and with the counter value indicative of the value of services remaining or used.

Clearly, if this EEPROM could be fraudulently re-programmed, potentially unlimited services could be obtained with cut payment.

Generally, to prevent such fraud, the card is completely inserted into the service-providing machine. Therefore, it is impossible to pull the card out before completion of the EEPROM programming by the service machine. However, it may be possible for a frauder to try to re-programme or corrupt the EEPROM outside the service machine. For example, a frauder could try to copy a counter value into the EEPROM and simultaneously vary the programming time or voltage. If some bits program faster than others, there may result random values that are different from the initial counter value, possibly resulting in gains for the frauder.

It is therefore an object of the present invention to provide a memory card in which the possibility of such fraud is greatly reduced.

Accordingly, the invention provides a memory card comprising an integrated circuit on a semiconductor chip embedded in a plastic card, the chip including at least two memories coupled in parallel to store the same data and a comparator for comparing the data stored in the memories and for disabling the chip if the data in each of the memories is not the same.

Figure 2:
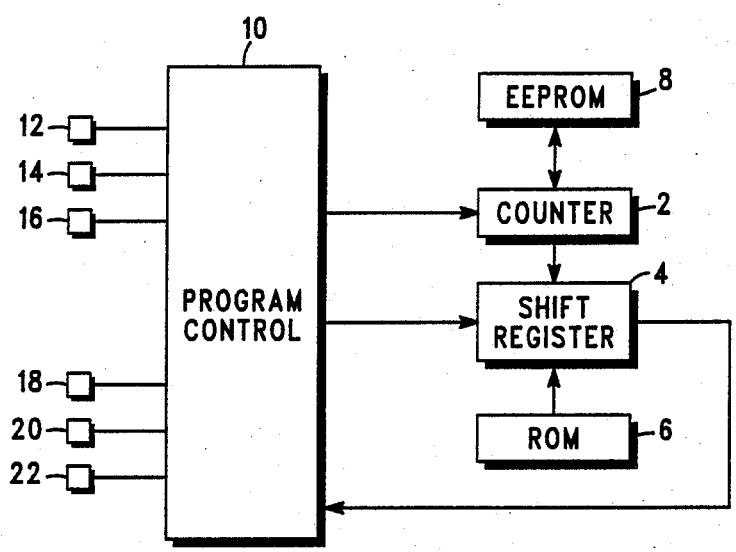

The card preferably further comprises a counter, whose value at the end of a transaction involving the card is stored in the memories, which may be EEPROM's. The values stored in each of the memories are conveniently compared directly before the start of a new transaction involving the card and, if the values are the same, such value is transferred to the counter. One embodiment of a memory card according to the invention will now be more fully described by way of example with reference to the drawings of which:

FIG. 1 is a block diagram of part of an integrated circuit embedded in known memory cards, and FIG. 2 is a block diagram of part of an integrated circuit for embedding in a memory card according to the invention. As is known, the minimum circuitry required for a debit card of the type having a semiconductor chip 1 embedded in a plastic card 3 consists of a non volatile counter, a shift register 4 and a Read Only Memory (ROM) 6, or a Programmable ROM (PROM) as is shown in FIG. 1. This ROM 6 is used for the identification of the type of card according to ISO standards.

The non-volatile counter is made up of a binary up-counter 2 with no wrap-around and of corresponding Electrically Erasable PROM bits (EEPROM) 8. The operation of the EEPROM and of the rest of the circuitry requires some program control circuitry 10. The control circuitry has three supply inputs—a programming voltage input 12, a supply voltage input 14 and a reference voltage input 16. It also has three ports—a data input/output port 18, a clock input 20 and a reset input 22.

When the card is inserted into a service machine for a transaction, the data stored in the EEPROM 8 is transferred to the counter 2. During the transaction, information is input to the shift register from the service machine via the control circuitry 10 from the counter 2 and the ROM 6. Information is also output from the shift register 4 to the control circuitry 10 which accordingly increments the counter 2. Indeed, the only information that can be input to the counter is to increment it. There is no transfer from the shift register to the counter possible, otherwise fraud could occur. At the end of the transaction the value in the counter 2 is transferred to the EEPROM 8. It is then possible to read the EEPROM content via the shift register 4 to check whether the programming of the EEPROM 8 is correct. The next time the card is used, the counter 2 is loaded with the new EEPROM value.

As mentioned above, it is generally impossible to fraudulently influence the programming of the EEPROM while the card is fully inserted in the machine. However by attempting to reprogram the EEPROM when the card is out of the machine, a frauder may sometime be able to achieve a gain in the counter value stored in the EEPROM.

Figure 3:
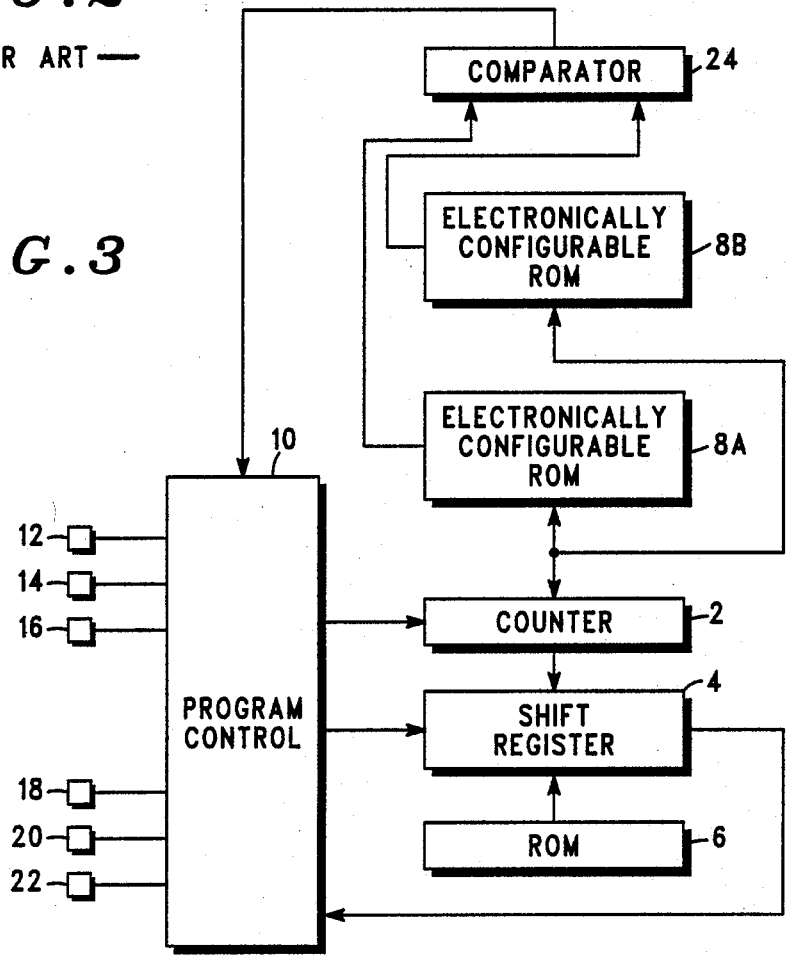

Accordingly, as shown in Figure 3, the invention provides two EEPROM memory banks 8A and 8B, both of which are programmed with the counter value at the end of a transaction. At the start of a new transaction, the values stored in both of the EEPROMs 8A and 8B are compared by a comparator 24. If the values are the same, then this value is passed to the counter 2 as previously discussed. If, however, there is a discrepancy in the values, chip operation is blocked, the counter is set to its maximum value and thus the transaction is not allowed to continue. Such a maximum count is of course then stored in EEPROM's 8A and 8B and the card cannot be used again. It may even be desirable for the service machine to retain the debit card in such cases.

If the values are the same and the value is passed to the counter, the transaction continues and increments the value of the counter. The final value is then stored in each of the EEPROMs before the card is removed. The EEPROMs will be preset with a maximum count value during initialisation and the difference between the final value and the maximum value will be the remaining credit left in the card for further transactions.

Such parallel EEPROMs increase the security of the card as it is very unlikely that manipulation of the card during fraudulent reprogramming will lead to identical values in both EEPROMs. Similarly, a failure of individual memory bits, stuck at one or zero, could lead to unlimited use of the card if there is only one EEPROM. A dual memory bank prevents such unlimited use.

It will, of course, be apparent that more than two parallel memories could be used to further increase security. Also, although the invention has been describe by way of example as utilising EEPROMs for the memories, it will be appreciated that any electrically configurable ROMs could be used, for example Electrically Alterable ROMs (EAROM).

Furthermore, by doubling the size of the memory, longer secret codes, such as the PIN, may be stored which increases the security, since the possibility of finding the code by testing is reduced.

We claim:

1. A memory card comprising an integrated circuit on a semiconductor chip embedded in a plastic card, the chip comprising:

a first non-volatile memory for storing data;

a second non-volatile memory for storing data, said first and second non-volatile memories being coupled in parallel;

generating means coupled to each of said first and second memories for generating data to be written to both said first and second memories whereby after each use of the card the same data is written to said first and second non-volatile memories; and comparator means for comparing on subsequent use of the card the data stored in the first and second memories and for disabling the chip if the data in the first and second memories is not the same.

2. A memory card according to claim 1 wherein said memories are EEPROMs.

3. A memory card according to claim 1 wherein said memories are EAROMs.

4. A memory card according to claim 1 wherein said generating means comprises a counter, whose value at the end of a transaction involving use of the card, is stored in the memories.

5. A memory card according to claim 4 wherein the values stored in each of the memories are compared directly before the start of a new transaction involving use of the card and, if the values are the same, such value is transferred to the counter.

6. A memory card according to claim 5 which is a debit card and wherein the transaction includes incrementing the value of the counter and storing the final value in each of the memories.

* * * * *